United States Patent
Kim et al.

(10) Patent No.: US 12,282,221 B2
(45) Date of Patent: Apr. 22, 2025

(54) OPTICAL LAMINATE, METHOD FOR MANUFACTURING SAME, SMART WINDOW COMPRISING SAME, AND VEHICLE AND BUILDING WINDOW OR DOOR EMPLOYING SAME

(71) Applicant: DONGWOO FINE-CHEM CO., LTD., Iksan-si (KR)

(72) Inventors: Sung-Su Kim, Pyeongtaek-si (KR); Sung-Ho Baek, Pyeongtaek-si (KR); Hong-Jun Ahn, Seoul (KR); Pyoung-Yun Oh, Pyeongtaek-si (KR)

(73) Assignee: DONGWOO FINE-CHEM CO., LTD., Iksan-si (KR)

( * ) Notice: Subject to any disclaimer, the term of this patent is extended or adjusted under 35 U.S.C. 154(b) by 0 days.

(21) Appl. No.: 18/291,431

(22) PCT Filed: Sep. 20, 2022

(86) PCT No.: PCT/KR2022/014011
§ 371 (c)(1),
(2) Date: Jan. 23, 2024

(87) PCT Pub. No.: WO2023/054962
PCT Pub. Date: Apr. 6, 2023

(65) Prior Publication Data
US 2024/0369873 A1  Nov. 7, 2024

(30) Foreign Application Priority Data

Sep. 28, 2021 (KR) .......................... 10-2021-0127732
May 24, 2022 (KR) .......................... 10-2022-0063405

(51) Int. Cl.
*G02F 1/13363* (2006.01)
*G02F 1/1335* (2006.01)
(Continued)

(52) U.S. Cl.
CPC .. *G02F 1/133531* (2021.01); *G02F 1/133631* (2021.01); *G02F 1/133637* (2021.01);
(Continued)

(58) Field of Classification Search
CPC ..................... G02F 1/133528; G02F 1/133531
See application file for complete search history.

(56) References Cited

U.S. PATENT DOCUMENTS

| 5,179,457 A * | 1/1993 | Hirataka ............... G02F 1/1397 349/119 |
| 2015/0015830 A1* | 1/2015 | Kim .................. G02F 1/133528 349/96 |
| 2018/0052351 A1* | 2/2018 | Nakamura .......... G02F 1/13363 |

FOREIGN PATENT DOCUMENTS

| JP | 2018-10035 A | 1/2018 |
| JP | 2020-170147 A | 10/2020 |

(Continued)

*Primary Examiner* — Paisley L Wilson
(74) *Attorney, Agent, or Firm* — NSIP Law

(57) ABSTRACT

The present invention relates to a transmittance-variable optical laminate, a method for manufacturing same, a smart window comprising same, and a vehicle and building window or door employing same, the optical laminate comprising: a first polarizing plate including a first polarizer and a polarization rotation layer; a first transparent conductive layer formed on one surface of the first polarizing plate; a second polarizing plate including a second polarizer and a retardation layer, and facing the first polarizing plate; a second transparent conductive layer formed on one surface of the second polarizing plate, and facing the first transparent conductive layer; and a liquid crystal layer provided between the first transparent conductive layer and the second transparent conductive layer.

18 Claims, 4 Drawing Sheets

(51) Int. Cl.
 G02F 1/1339 (2006.01)
 G02F 1/1343 (2006.01)
 G02F 1/137 (2006.01)

(52) U.S. Cl.
 CPC .... G02F 1/133638 (2021.01); G02F 1/13398 (2021.01); G02F 1/13439 (2013.01); G02F 1/137 (2013.01)

(56) References Cited

FOREIGN PATENT DOCUMENTS

| | | | |
|---|---|---|---|
| JP | 2021-60561 A | | 4/2021 |
| KR | 10-2007-0069090 A | | 7/2007 |
| KR | 100877926 B1 | * | 1/2009 |
| KR | 10-2011-0009696 A | | 1/2011 |
| KR | 10-2018-0082474 A | | 7/2018 |
| KR | 20180082474 A | * | 7/2018 |
| KR | 10-2018-0124966 A | | 11/2018 |
| KR | 10-2019-0049571 A | | 5/2019 |
| KR | 10-2010760 B1 | | 8/2019 |
| KR | 10-2021-0049688 A | | 5/2021 |
| WO | WO 2018/012365 A1 | | 1/2018 |

* cited by examiner

OPTICAL LAMINATE, METHOD FOR MANUFACTURING SAME, SMART WINDOW COMPRISING SAME, AND VEHICLE AND BUILDING WINDOW OR DOOR EMPLOYING SAME

CROSS REFERENCE TO RELATED APPLICATIONS

This application is a U.S. National Stage Application of International Application No. PCT/KR2022/014011, filed on Sep. 20, 2022, which claims the benefit under 35 USC 119(a) and 365(b) of Korean Patent Application No. 10-2021-0127732, filed on Sep. 28, 2021 and Korean Patent Application No. 10-2022-0063405, filed on May 24, 2022, in the Korean Intellectual Property Office, the entire disclosure of which is incorporated herein by reference for all purposes.

TECHNICAL FIELD

The present disclosure relates to a variable transmittance optical stack, a method for manufacturing the same, a smart window including the same, and windows and doors for a vehicle and a building employing the same.

BACKGROUND ART

In general, there are many cases in which an external light blocking coating is applied to a window of a means of transportation such as a vehicle. However, a transmittance of a conventional window of a means of transportation is fixed, and a transmittance of the external light blocking coating is also fixed. Therefore, the entire transmittance of the conventional window of the means of transportation is fixed, thereby causing an accident. For example, when the entire transmittance is preset low, there is no problem during day when ambient light is sufficient. However, there is a problem in that it is difficult for a driver or the like to properly check the surroundings of the means of transportation at night when ambient light is insufficient. Alternatively, when the entire transmittance is preset high, there is a problem of causing glare to a driver or the like during day when ambient light is sufficient. Accordingly, a variable transmittance optical stack capable of changing the transmittance of light when a voltage is applied has been developed.

The variable transmittance optical stack is driven by changing the transmittance by driving liquid crystal according to voltage application. The variable transmittance optical stack developed so far is manufactured by forming a conductive layer for driving liquid crystal on a separate or additional substrate, and then combining the conductive layer with other elements such as a polarizing plate.

For example, Japanese Patent Publication Application No. 2018-010035 discloses a variable transmittance optical stack including a transparent electrode layer formed on a polycarbonate (PC) substrate having a predetermined thickness.

However, when a separate or additional substrate is included to form the conductive layer as described above, as a manufacturing process becomes complicated, manufacturing costs is increased, the thickness of the laminate is increased, and the transmittance is changed due to occurrence of retardation.

Accordingly, there is a need to develop a transmittance variable optical stack capable of simplifying a manufacturing process, reducing the thickness as excluding a separate or additional substrate for forming a conductive layer.

DISCLOSURE

Technical Problem

The present disclosure is intended to provide a variable transmittance optical stack having a simplified manufactured process without a separate or additional substrate for forming a conductive layer.

Another objective of the present disclosure is to provide a variable transmittance optical stack having a thickness significantly reduced without a separate or additional substrate for forming a conductive layer.

Yet another objective of the present disclosure is to provide a variable transmittance optical stack having an improved transmittance thereof in a light transmissive mode without a separate or additional substrate for forming a conductive layer.

Still another objective of the present disclosure is intended to provide a variable transmittance optical stack having improved light blocking performance in a light blocking mode by adjusting a characteristic of wavelength dispersion of a polarizing rotation layer included in a polarizing plate.

Still another objective of the present disclosure is intended to provide a variable transmittance optical stack having improved light blocking performance in a light blocking mode by adjusting a characteristic of a retardation layer included in a polarizing plate.

Still another objective of the present disclosure is to provide a smart window including the variable transmittance optical stack, and windows and doors for a vehicle or a building to which the same is applied.

However, the problem to be solved by the present disclosure is not limited to the problems mentioned above, and other problems not mentioned will be clearly understood by those skilled in the art from the description below.

Technical Solution

The present disclosure relates to a variable transmittance optical stack including: a first polarizing plate including a first polarizer and a polarizing rotation layer; a first transparent conductive layer formed on one surface of the first polarizing plate; a second polarizing plate including a second polarizer and a retardation layer, and opposing the first polarizing plate; a second transparent conductive layer formed on one surface of the second polarizing plate, and opposing the first transparent conductive layer; and a liquid crystal layer provided between the first transparent conductive layer and the second transparent conductive layer, wherein at least one transparent conductive layer of the first transparent conductive layer and the second transparent conductive layer may be formed by directly contacting with any one polarizing plate of the first polarizing plate and the second polarizing plate, the polarizing rotation layer may have reverse wavelength or flat wavelength dispersion characteristic, and the retardation layer may include a negative C plate.

In a first aspect of the present disclosure, the polarizing rotation layer may be provided at an inside position based on the first polarizer.

In a second aspect of the present disclosure, the polarizing rotation layer may have a ratio of an in-plane retardation value at 450 nm wavelength to an in-plane retardation value at 550 nm wavelength, the ratio ranging from 0.75 to 1.0.

In a third aspect of the present disclosure, the polarizing rotation layer may include a single-layered or multi-layered half-wavelength plate.

In a fourth aspect of the present disclosure, an in-plane retardation value of the half-wavelength plate may range from 250 to 300 nm.

In a fifth aspect of the present disclosure, the retardation layer may be provided at an inside position based on the second polarizer.

In a sixth aspect of the present disclosure, a thickness-directional retardation value of the retardation layer may range from 10 to 500 nm.

In a seventh aspect of the present disclosure, an absorbing axis of the first polarizer and an absorbing axis of the second polarizer may be parallel to each other.

In an eighth aspect of the present disclosure, the liquid crystal layer may be driven in a twisted nematic mode.

In a ninth aspect of the present disclosure, at least one transparent conductive layer of the first transparent conductive layer and the second transparent conductive layer may be formed by directly contacting with any one polarizing plate of the first polarizing plate and the second polarizing plate without a separate or additional substrate between the polarizing plate and the transparent conductive layer.

In a tenth aspect of the present disclosure, at least one transparent conductive layer of the first transparent conductive layer and the second transparent conductive layer may be formed by directly contacting with any one polarizing plate of the first polarizing plate and the second polarizing plate with a highly adhesive layer between the polarizing plate and the transparent conductive layer.

In an eleventh aspect of the present disclosure, at least one transparent conductive layer of the first transparent conductive layer and the second transparent conductive layer may include one or more types selected from a group consisting of transparent conductive oxide, metal, carbonaceous matter, conductive polymers, conductive ink, and nanowires.

In a twelfth aspect of the present disclosure, at least one polarizing plate of the first polarizing plate and the second polarizing plate may include one or more types of functional layers selected from a group consisting of a protective layer and a refractive index-matching layer.

In a thirteenth aspect of the present disclosure, at least one polarizing plate of the first polarizing plate and the second polarizing plate may have a thickness ranging from 30 to 200 μm.

In a fourteenth aspect of the present disclosure, the liquid crystal layer may include one or more types selected from a group consisting of a ball spacer and a column spacer.

In a fifteenth aspect of the present disclosure, the ball spacer may have a diameter ranging from 1 to 10 μm.

In a sixteenth aspect of the present disclosure, an occupancy area of the ball spacer in the liquid crystal layer may range from 0.01 to 10% of the area of the liquid crystal layer.

In a seventeenth aspect of the present disclosure, the variable transmittance optical stack may include one or more types selected from a group consisting of an alignment film, a pressure sensitive adhesive/adhesive layer, an ultraviolet ray absorption layer, and a hard coating layer.

The present disclosure relates to a manufacturing method for the variable transmittance optical stack.

The present disclosure relates to the smart window including the transmittance variable optical stack.

The present disclosure relates to a vehicle in which the smart window is applied to at least one of a front window, a rear window, a side window, a sunroof window, and an inner partition thereof.

The present disclosure relates to a window and a door for a building including the smart window.

Advantageous Effects

Furthermore, the variable transmittance optical stack according to the present disclosure is formed without the process of forming a conductive layer on a substrate for forming the conventional optical stack and bonding it to other members, etc., so that the manufacturing process thereof can be simplified in comparison to the conventional optical stack.

The variable transmittance optical stack according to the present disclosure is formed without a separate or additional substrate for forming the conductive layer as the conductive layer is directly formed on one surface of the polarizing plate, so that the thickness thereof can be significantly reduced in comparison to the thickness of the conventional optical stack.

The variable transmittance optical stack according to the present disclosure is formed without a separate or additional substrate for forming the conductive layer as the conductive layer is directly formed on one surface of the polarizing plate, so that a transmittance in the light transmissive mode can be improved in comparison to the conventional optical stack.

The variable transmittance optical stack according to the present disclosure is configured to adjust the characteristic of wavelength dispersion of the polarizing rotation layer included in the polarizing plate, so that light blocking performance of the optical stack in the light blocking mode can be improved in comparison to the conventional optical stack.

The variable transmittance optical stack according to the present disclosure includes the retardation layer included in the polarizing plate, which includes the negative C plate, so that light blocking performance of the optical stack in the light blocking mode can be improved, and specifically side light leakage thereof can be further reduced in comparison to the conventional optical stack.

BEST MODE

Figure 1:
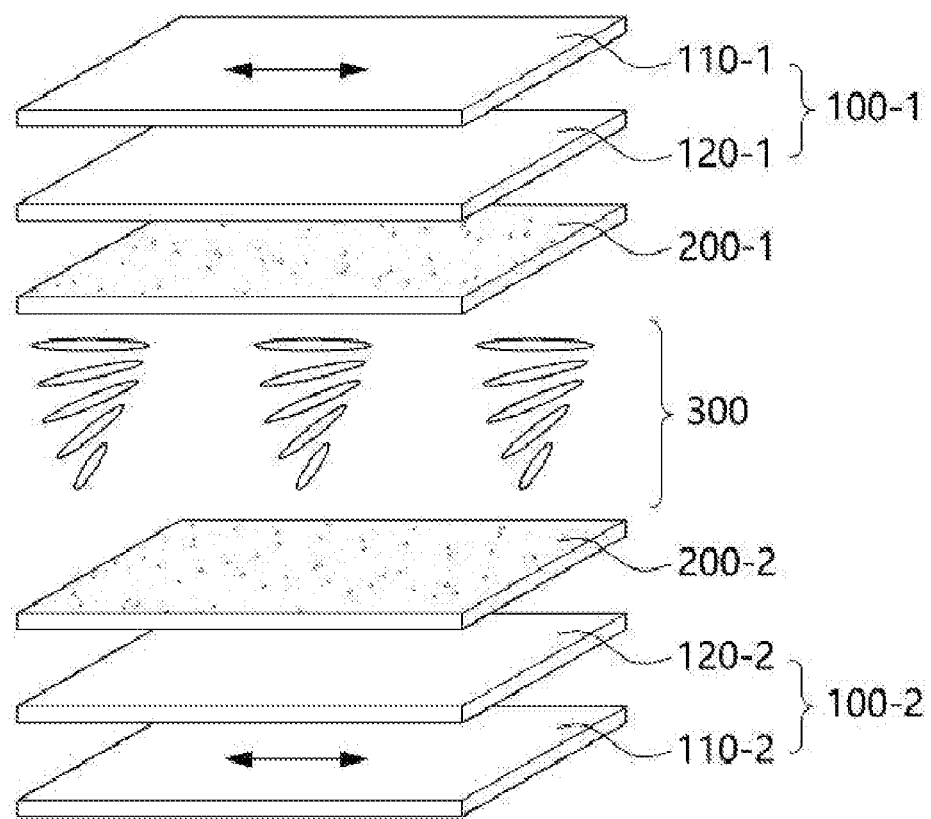
FIG. 1 is a view showing a laminate structure of a variable transmittance optical stack according to an embodiment of the present disclosure.

The present disclosure relates to a variable transmittance optical stack including a polarizing rotation layer and a retardation layer and, specifically, since a conductive layer for driving liquid crystal is directly formed on one surface of a polarizing plate and a separate or additional substrate for forming the conductive layer to reduce a thickness of the laminate to improve the transmittance in a light transmissive mode, and a wavelength dispersion characteristic of a polarizing rotation layer and a characteristic of the retardation layer are adjusted to improve the light blocking performance in a light blocking mode, specifically, to further reduce side light leakage.

More specifically, the variable transmittance optical stack includes: a first polarizing plate including a first polarizer and a polarizing rotation layer; a first transparent conductive layer formed on one surface of the first polarizing plate; a second polarizing plate including a second polarizer and a retardation layer, and opposing the first polarizing plate; a second transparent conductive layer formed on one surface of the second polarizing plate, and opposing the first transparent conductive layer; and a liquid crystal layer provided between the first transparent conductive layer and the second transparent conductive layer, wherein at least one transparent conductive layer of the first transparent conductive layer and the second transparent conductive layer is formed by directly contacting with any one polarizing plate of the first polarizing plate and the second polarizing plate, and the polarizing rotation layer has a reverse wavelength or flat wavelength dispersion characteristic, and the retardation layer includes a negative C plate.

The variable transmittance optical stack of the present disclosure is particularly suitable for technical fields where light transmittance can be changed in response to application of voltage, for example, may be used for a smart window, etc.

In the present disclosure, the smart window includes an optical structure controlling the amount of light or heat passing through the window by changing light transmittance in response to an electrical signal, and the present disclosure is not limited thereto. In other words, the smart window of the present disclosure is provided to be changed into a transparent, opaque, or translucent state by voltage and conceptually includes variable transmittance glass, lighting control glass, or smart glass.

The smart window may be used as partitions for partitioning an internal space of vehicles and buildings or for protecting privacy, or as skylights arranged in openings of buildings, and may be used as highway signs, noticeboards, scoreboards, clocks, or advertising screens, and may be used to replace glass of a means of transportation, such as windows or sunroof windows of cars, buses, aircrafts, ships, or trains.

The variable transmittance optical stack of the present disclosure may also be used for the smart window of the various technical fields mentioned above, but since the conductive layer is directly formed in the polarizing plate, there is no need to include a separate or additional substrate for forming the conductive layer and the thickness thereof is thin and is advantageous in the flexuosity, so the optical stack of the present disclosure may be used to be particularly suitable for a smart window of a vehicle or a building. According to one or a plurality of embodiments, the smart window to which the variable transmittance optical stack of the present disclosure is applied may be used for front windows, rear windows, side windows, and sunroof windows of a vehicle, or windows and doors for a building, and the smart window may be used to not only an external light blocking use, but also an internal space partitioning use or a privacy protecting use such as an inner partition for a vehicle or a building.

Hereinbelow, embodiments of the present disclosure will be described in detail with reference to drawings. However, the following drawings accompanying this specification illustrate preferred embodiments of the present disclosure, and serve to further understand the technical idea of the present disclosure with the contents of the above-described invention. Therefore, the present disclosure should not be construed as being limited to matters described in the drawings.

Terms used in this specification are selected to describe embodiments and thus do not limit the present disclosure. In this specification, an element expressed in a singular form may be plural elements unless it is necessarily singular in the context. For example, "the polarizing plate" used in the specification may mean at least one polarizing plate of the first polarizing plate and the second polarizing plate, and "the polarizer" may mean at least one polarizer of the first polarizer and the second polarizer, and "the transparent conductive layer" may mean at least one transparent conductive layer of the first transparent conductive layer and the second transparent conductive layer, and "the alignment layer" may mean at least one alignment layer the first alignment layer and the second alignment layer.

As used herein, terms "comprise" and/or "comprising" do not mean exclusion of the presence or absence of one or more components, steps, movements and/or elements other than a component, a step, movement, and/or an element mentioned above. The same reference numerals are used throughout the specification to designate the same or similar elements.

Spatially relative terms "below", "lower surface", "lower portion", "above", "upper surface", "upper portion" may be used to easily describe the correlation between "one element or components" and "another element or other components", as shown in drawings. The spatially relative terms should be understood as terms including different directions of an element when being used or operated in addition to a direction shown in the drawings. For example, when an element shown in the drawings is turned over, the element described as being "below" or "lower" concerning another element may be placed "on" the another element. Accordingly, the exemplary term "below" may include both downward and upward directions. An element may be aligned in a different direction, and accordingly, the spatially relative terms may be interpreted according to alignment.

The "planar direction" used in this specification may be interpreted as a direction perpendicular to a polarizing plate and/or a transparent conductive layer, that is, a direction viewed from the user's view side.

Figure 2A:
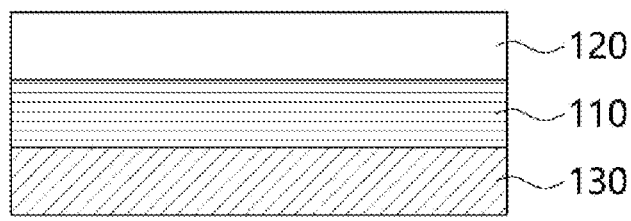
FIGS. 2A to 2C are views each showing a laminate structure of a polarizing plate according to one or a plurality of embodiments of the present disclosure.
Figure 2B:
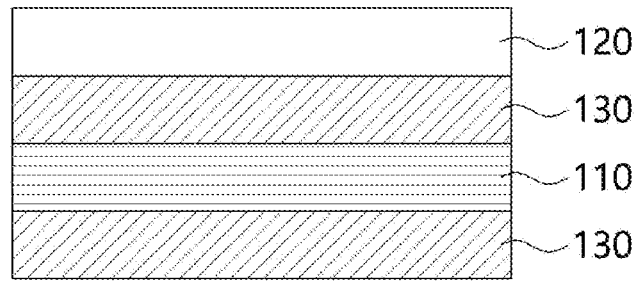
Figure 2C:
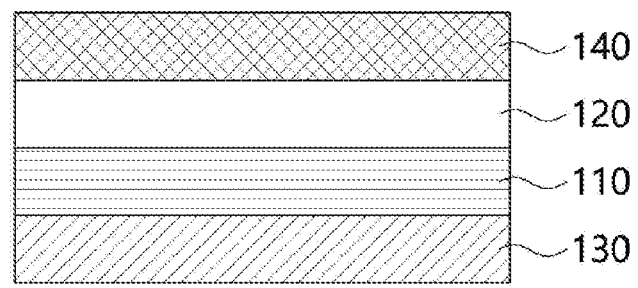

FIG. 1 is a view showing a laminate structure of a variable transmittance optical stack according to an embodiment of the present disclosure. FIGS. 2A to 2C are views each showing a laminate structure of a polarizing plate according to one or a plurality of embodiments of the present disclosure.

Referring to FIG. 1, the variable transmittance optical stack according to the embodiment of the present disclosure includes a first polarizing plate 100-1, a second polarizing plate 100-2, a first transparent conductive layer 200-1, a second transparent conductive layer 200-2, and a liquid crystal layer 300.

Referring to FIGS. 1 and 2, the first polarizing plate 100-1 may include a first polarizer 110-1 and a polarizing rotation layer 120-1, and the second polarizing plate 100-2 may include a second polarizer 110-2 and a retardation layer 120-2.

In one or a plurality of embodiments, the polarizing plate 100 may include a functional layer such as a protective layer 130 and a refractive index-matching layer 140 on one surface or opposite surfaces of a polarizer 110. For example, the polarizing plate 100 may be a plate formed by successively laminating a polarizing rotation layer or the retardation layer 120, the polarizer 110, and the protective layer 130 (referring to FIG. 2A), and may be a plate formed by successively laminating the polarizing rotation layer or the retardation layer 120, the protective layer 130, the polarizer 110, and the protective layer 130 (referring to FIG. 2B), and may be a plate formed by successively laminating the refractive index-matching layer 140, the polarizing rotation layer or the retardation layer 120, the polarizer 110, and the protective layer 130 (referring to FIG. 2C).

The polarizer 110 may use a polarizer currently developed or to be developed, and, for example, may use a stretched polarizer, a coatable polarizer, etc.

According to an embodiment, the stretched polarizer may contain a stretched polyvinyl alcohol (PVA)-based resin. The PVA-based resin may be PVA-based resin obtained by saponifying polyvinyl acetate resin. In addition to polyvinyl acetate that is homopolymer of vinyl acetate, vinyl acetate and a copolymer with other monomers that can be copolymerized with vinyl acetate may be used as the polyvinyl acetate-based resin. As the other monomers, unsaturated carboxylic acid-based monomers, unsaturated sulfonic acid-based monomers, olefin-based monomers, vinyl ether-based monomers, acrylamide having ammonium groups-based monomers, and the like may be used. Furthermore, the PVA-based resin contains a denatured resin, and for example, may be polyvinyl formal or polyvinyl acetal denatured into aldehyde.

According to an embodiment, the coatable polarizer may be formed of a composition for liquid crystal coating, and, at this point, the composition for liquid crystal coating may contain reactive liquid crystal compound, and dichroic dye, etc.

The reactive liquid crystal compound is not particularly limited as long as it can have the polarizing characteristic, and may use a reactive liquid crystal compound currently developed or to be developed later.

The reactive liquid crystal compound may mean a compound, for example, containing a mesogen frame, etc., and also containing one or more polymerizable functional groups. The reactive liquid crystal compound may be variously known by the name reactive mesogen (RM). The reactive liquid crystal compound may constitute a cured film with a polymer network formed while being polymerized by light or heat and maintaining a liquid crystal arrangement.

The reactive liquid crystal compound may be a mono-functional liquid crystal compound or a multi-functional liquid crystal compound. The mono-functional liquid crystal compound is a compound having 1 polymerizable functional group, and a multi-functional liquid crystal compound may mean a compound having two or more polymerizable functional groups.

The dichroic dye is a substance contained in the composition for liquid crystal coating to impart the polarization characteristic and has a characteristic in which absorbance in a direction of the long axis of a molecule and absorbance in a direction of the short axis are different. The dichroic dyes may be dichroic dyes currently developed or to be developed and may contain one or more types of dyes selected from a group consisting of azo dyes, anthraquinone dyes, perylene dyes, merocyanine dyes, azomethine dyes, phthaloperylene dyes, indigo dyes, dioxazine dyes, polythiophene dyes, and phenoxazine dyes.

The composition for liquid crystal coating may contain a solvent capable of dissolving the reactive liquid crystal compound and the dichroic dye. For example, propylene glycol monomethyl ether acetate (PGMEA), methyl ethyl ketone (MEK), xylene, chloroform, and the like may be used. Furthermore, the composition for liquid crystal coating may contain leveling agents, a polymerization initiator, etc. within a range that does not deteriorate the polarization characteristics of a coating film.

According to an embodiment, an absorbing axis of the first polarizer and an absorbing axis of the second polarizer may be arranged in parallel to each other. In this case, the absorbing axis and a machine direction (MD) of the polarizer are parallel to each other, so that the arrangement may be advantageous for enlargement in area of the variable transmittance optical stack.

Figure 3:
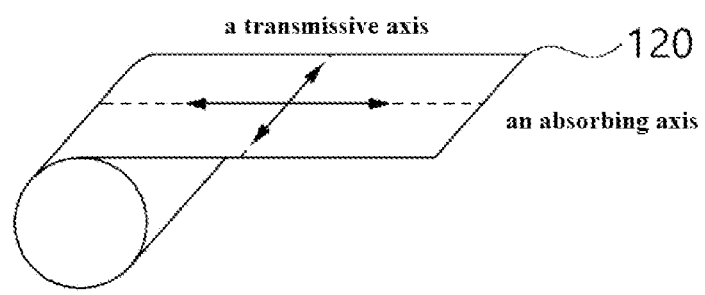
FIG. 3 is a view showing an absorbing axis and a transmissive axis of a roll-shaped raw film providing a polarizer according to an embodiment of the present disclosure.

Specifically, FIG. 3 is a view showing an absorbing axis and a transmissive axis of a roll-shaped raw film providing a polarizer according to an embodiment of the present disclosure.

Referring to FIG. 3, the polarizer according to the embodiment of the present disclosure may be manufactured by the roll-to-roll process, and the roll-to-roll process uses a roll-shaped raw film in which the MD of the polarizer is parallel to the absorbing axis of the polarizer and a transverse direction (TD) is parallel to a transmissive axis of the polarizer.

At this point, when absorbing axes of two different polarizing plates are parallel to each other, according to needs of a user, two polarizers having predetermined MD lengths may be efficiently manufactured and enlargement of the optical stack may be advantageous.

The polarizing rotation layer 120-1 is provided to rotate polarized light passed through the polarizer 110 to practically 90°, and may use a polarizing rotation layer currently developed or to be developed later, and practically 90° may be for example from 85° to 95°.

As shown in FIGS. 2A and 2C, the polarizing rotation layer 120-1 may be formed by directly contacting with one surface of the first polarizer 110-1 but is not limited thereto. For example, as shown in FIG. 2B, the polarizing rotation layer 120 is formed on one surface of the protective layer 130, and the polarizing rotation layer 120, the protective layer 130, the polarizer 110, and the protective layer 130 may be successively laminated.

The polarizing rotation layer 120-1 is preferably formed on one surface in a direction of the liquid crystal layer 300 based on the first polarizer 110-1, i.e., at an inside position of the first polarizer 110-1. In this case, there is an advantage of easily changing the optical characteristic of light passing through the polarizer 110.

The polarizing rotation layer 120-1 may have a reverse wavelength or flat wavelength dispersion characteristic, preferably a reverse wavelength dispersion characteristic. When the polarizing rotation layer 120-1 has the reverse wavelength or flat wavelength dispersion characteristic, and specifically, when the polarizing rotation layer 120-1 has the reverse wavelength dispersion characteristic, the light blocking performance of the optical stack in the light blocking mode can be further improved.

In one or a plurality of embodiments, when the polarizing rotation layer 120-1 has the reverse wavelength dispersion characteristic, a ratio ($R_{in}(450)/R_{in}(550)$) of the in-plane retardation value $R_{in}(450)$ at wavelength of 450 nm to an in-plane retardation value $R_{in}(550)$ at wavelength of 550 nm may be equivalent to or greater than 0.75 and less than 1.0, and when the polarizing rotation layer 120-1 has the flat wavelength dispersion characteristic, the ratio $R_{in}(450)/R_{in}(550)$ of the in-plane retardation value $R_{in}(450)$ at wavelength of 450 nm to the in-plane retardation value $R_{in}(550)$ at wavelength of 550 nm may be 1.0.

In one or a plurality of embodiments, the polarizing rotation layer 120-1 may include a half-wavelength plate of a single layer or multiple layers.

When the polarizing rotation layer 120-1 includes a half-wavelength plate of single layer, i.e., when the polarizing rotation layer 120-1 includes one half-wavelength plate, the characteristic of the polarizing rotation layer 120-1 may correspond to the characteristic of the half-wavelength plate. In this case, the half-wavelength plate has preferably the reverse wavelength or flat wavelength dispersion characteristic, and an optical axis of the half-wavelength plate is preferably formed with a contained angle ranging from 40° to 50° with respect to an absorbing axis of the polarizer 110.

When the polarizing rotation layer 120-1 includes multi-layered half-wavelength plates, this structure is provided for the polarizing rotation layer 120-1 to rotate light polarized while passing through the polarizer 110, etc., practically to 90°, and an individual characteristic of the half-wavelength plate is not particularly limited as long as it has the reverse wavelength or flat wavelength dispersion characteristic. For example, when the polarizing rotation layer 120-1 has a double-layer structure of a first half-wavelength plate and a second half-wavelength plate, the first half-wavelength plate and the second half-wavelength plate may have the reverse wavelength, regular wavelength, or flat wavelength dispersion characteristic, respectively. An optical axis of the first half-wavelength plate may be formed to have a contained angle ranging from 20° to 25° with respect to an absorbing axis or a transmissive axis of the polarizer 110, and an optical axis of the second half-wavelength plate may be formed to have a contained angle ranging from 65° to 70° with respect to the absorbing axis or the transmissive axis of the polarizer 110.

According to an embodiment, an in-plane retardation value $R_{in}$ of the half-wavelength plate may range from 250 to 300 nm, and when the polarizing rotation layer 120-1 includes one half-wavelength plate, the in-plane retardation value $R_{in}$ of the half-wavelength plate may satisfy the above range, and when the polarizing rotation layer 120-1 includes multiple half-wavelength plates, an in-plane retardation value $R_{in}$ of each half-wavelength plate may satisfy the above range. When the in-plane retardation of the half-wavelength plate satisfies the above range, the light blocking performance in the light blocking mode of the optical stack may be improved.

The half-wavelength plate may be a polymer stretched film or a liquid crystal polymerized film, formed by stretching a polymer film that can impart optical anisotropy by stretching in an appropriate manner.

According to an embodiment, the polymer stretched film may use a polymer layer containing polyolefin such as polyethylene (PE), polypropylene (PP), etc., cyclo olefin polymer (COP) such as polynorbornene, etc., polyester such as polyvinyl chloride (PVC), polyacrylonitrile (PAN), polysulfone (PSU), acryl resin, polycarbonate (PC), polyethylene terephthalate (PET), etc.; and/or cellulose ester polymer such as polyacrylate, polyvinyl alcohol (PVA), triacetyl cellulose (TAC), etc., or a copolymer of two or more monomers among monomers that can form the polymers.

A method for obtaining the polymer stretched film is not particularly limited and, for example, may be obtained by forming the polymer material into a film shape and then stretching the material. The molding method for the film shape is not particularly limited, and the polymer stretched film may be formed in the known methods such as injection molding, sheet molding, blow molding, injection blow molding, inflation molding, extrusion molding, foaming molding, cast molding, etc., and may be formed in a secondary processing molding method such as pressure molding, vacuum molding, etc. Among them, extrusion molding and cast molding may be preferably used. At this point, for example, an unstretched film may be extruded by using an extruder to which a T-die, a circular die, etc., may be mounted. When a molded product is obtained in extrusion molding, a material made by melt-kneading various resin components, additives, etc., in advance, may be used and the molded product may be formed by melt-kneading during extrusion molding. Furthermore, various resin components are dissolved by using a common solvent, for example, a solvent such as chloroform, 2 methylene chloride, etc., and then are solidified in a cast dry manner, and accordingly, the non-stretched film may be cast-molded.

The polymer stretched film may be provided by performing uniaxial stretching with respect to the molded film in the mechanical direction (MD, longitudinal or length direction), and by performing uniaxial stretching in the direction (TD, transverse direction or width direction) perpendicular to the MD, and furthermore, the molded film is stretched in a sequential biaxial stretching method of roll stretching and tenter stretching, a simultaneous biaxial stretching method of tenter stretching, a biaxial stretching method of tubular stretching, etc., so that a biaxial stretched film may be manufactured.

The liquid crystal polymerized film may contain a reactive liquid crystal compound in a polymerized state, and may use a reactive liquid crystal compound currently developed or to be developed later, and for example, the description of the reactive liquid crystal compound of the coatable polarizer described above may be equally applied thereto.

The retardation layer 120-2 is provided to supplement the optical characteristic of the optical stack, the negative C plate may be included, and accordingly, side light leakage (diagonal direction) in the light blocking mode can be further reduced.

As shown in FIGS. 2A and 2C, the retardation layer 120-2 may be formed by directly contacting with one surface of the second polarizer 110-2 but is not limited thereto. For example, as shown in FIG. 2B, the retardation layer 120-2 is formed on one surface of the protective layer 130, and the retardation layer 120, the protective layer 130, the polarizer 110, and the protective layer 130 may be successively laminated.

The retardation layer 120-2 is preferably formed on one surface in the direction of the liquid crystal layer 300 based on the second polarizer 110-2, i.e., at an inside position of the second polarizer 110-2. In this case, there is an advantage of easily changing the optical characteristic of light passing through the polarizer 110.

Hereinbelow, the negative C plate included in the retardation layer 120-2 will be described in detail.

Specifically, the retardation layer (or retardation film) is divided into a uniaxial or biaxial retardation layer according to the number of optical axes, and is divided into a positive and negative retardation layer according to a difference in sizes of a refractive index in an optical axial direction and refractive index in another direction. For example, when one optical axis is provided, the retardation layer is classified into uniaxial, and when two optical axes are provided, the retardation layer is classified into biaxial. When the refractive index in the optical axial direction is larger than a refractive index in another direction, the retardation layer is classified into positive, and when the refractive index in the optical axial direction is smaller than a refractive index in another direction, the retardation layer is classified into negative.

The retardation layer may be represented with a refractive index in each direction in the xyz coordinate system. For example, when the retardation layer exists in the xy plane, an x axis and a y axis mean a planar direction of the retardation layer, and the retardation layer has nx, ny, and nz refractive indexes according to the x axis, the y axis, and the z axis.

At this point, the C plate is characterized in that the refractive index nx in the x axial direction and the refractive index ny in the y axial direction are equivalent to each other and the refractive index nz in the z axial direction is different from the refractive index nx in the x axial direction and the refractive index ny in the y axial direction. When the refractive index nx in the x axial direction and the refractive index ny in the y axial direction are smaller than the refractive index nz in the z axial direction, the C plate is a positive C plate, and the refractive index nx in x axial direction and the refractive index ny in the y axial direction are greater than the refractive index nz in the z axial direction, the C plate is a negative C plate.

Meanwhile, $R_{th}$ means a retardation value in a thickness direction (or retardation in the thickness direction), and may be equivalent to Equation 1 below.

$$R_{th} = ((nx + ny)/2 - nz) \cdot d \qquad \text{[Equation 1]}$$

In Equation 1 above, d means a thickness of the retardation layer.

According to an embodiment, the negative C plate included in the retardation layer 120-2 may have a retardation value $R_{th}$ in the thickness direction may range from 10 to 500 nm, preferably from 50 to 400 nm, more preferably from 50 to 300 nm. In this case, there is an advantage in that side light leakage (diagonal direction) in the light blocking mode can be further reduced.

In an embodiment or a plurality of embodiment, the negative C plate may use a cyclo-olefin-polymer (COP) film or a polycarbonate (PC) film, a UV curable horizontal or vertical alignment liquid crystal film, a polystyrene (PS) resin, a polyethylene terephthalate (PET), etc.

In an embodiment or a plurality of embodiments, a thickness of the retardation layer 120-2 may range from 1 μm to 100 μm.

The protective 130 is provided to preserve the polarization characteristic of the polarizer 110 from a post-processing and external environment and may be implemented into a form such as a protective film, etc.

As shown in FIGS. 2A to 2C, the protective layer 130 may be formed by directly contacting with one or both surfaces of the polarizer 110 but is not limited thereto. For example, the protective layer may be used as a double-layer structure in which one or more protective layers are successively laminated and may be formed in direct contact with another functional layer.

According to one or a plurality of embodiments, the protective layer 130 may contain one or more types selected from a group consisting of polyethylene terephthalate (PET), polyethylene isophthalate (PEI), polyethylene naphthalate (PEN), polybutylene terephthalate (PBT), diacetyl cellulose, triacetyl cellulose (TAC), polycarbonate (PC), polyethylene (PE), polypropylene (PP), polymethyl acrylate (PMA), polymethyl methacrylate (PMMA), polyethyl acrylate (PEA), polyethyl methacrylate (PEMA), and cyclic olefin polymer (COP).

The refractive index-matching layer 140 is provided to compensate for the refractive index difference of the optical stack by the transparent conductive layer 200, and may serve to improve the visible characteristic by reducing the difference of the refractive index. Furthermore, the refractive index-matching layer 140 may be provided to correct a color based on the transparent conductive layer 200. Meanwhile, when the transparent conductive layer has a pattern, the refractive index-matching layer 140 may correct the transmittance difference of a region with the pattern and a non-pattern region without the pattern.

Specifically, the transparent conductive layer 200 is laminated close to other members having a refractive index different therefrom (for example, the polarizer 110, etc.), and due to the difference of the refractive index between the transparent conductive layer and another layer close thereto, the difference of optical transmittance may be caused. Specifically, when the pattern is formed on the transparent conductive layer, there may be a problem in that the pattern region and the non-pattern region are visually distinguished from each other. Therefore, the refractive index-matching layer 140 is included to compensate for a refractive index, thereby reducing the difference with the optical transmittance of the optical stack. Specifically, when the pattern is formed on the transparent conductive layer, the pattern region and the non-pattern region should be provided so as not to be visually distinguished.

According to the embodiment, the refractive index of the refractive index-matching layer 140 may be appropriately selected according to a material of another adjacent member and may be preferably between 1.4 and 2.6, more preferably may be between 1.4 and 2.4. In this case, it is possible to prevent optical loss due to a sharp difference in the refractive index between another member such as the polarizer 110 and the transparent conductive layer 200.

The refractive index-matching layer 140 is not particularly limited as long as it can prevent the sharply refractive difference between other members, such as the polarizer 110, etc., and the transparent conductive layer, and may use a compound used in the formation of a refractive index-matching layer currently developed or to be developed. For example, the refractive index-matching layer 150 may be formed from refractive index-matching layer formation composition containing polymerizable isocyanate compound.

According to the embodiment, the polarizing plate 100 may include other functional layers to assist or strengthen the characteristics of the polarizer in addition to the above-mentioned functional layers and, for example, may include an overcoat layer, etc. to further improve the mechanical durability.

According to one or a plurality of embodiments, the polarizing plate 100 may have a thickness ranging from 30 to 200 μm, and preferably, a thickness ranging from 30 to 170 μm, and more particularly, a thickness ranging from 50 to 150 μm. In this case, while the polarizing plate 100 maintains the optical characteristic, the optical stack having a thin thickness can be manufactured.

The transparent conductive layer 200 is provided to drive the liquid crystal layer 300, and may be formed by directly contacting with the polarizing plate 100. For example, as shown in FIG. 1, the first transparent conductive layer 200-1 and the second transparent conductive layer 200-2 may be respectively formed by directly contacting with the first polarizing plate 100-1 and the second polarizing plate 100-2.

Conventionally, an optical stack used to manufacture a smart window, etc. is manufactured by forming a conductive layer for driving a liquid crystal on one surface of a substrate and bonding-coupling a second surface of the substrate to a polarizing plate. However, according to the present disclosure, the variable transmittance optical stack has the conductive layer directly formed on one surface of the polarizing plate without a separate or additional substrate for forming the conductive layer, and thus is characterized to improve the transmittance in a light transmissive mode and the curvature characteristic while reducing the entire thickness of the laminate.

According to the embodiment, the transparent conductive layer 200 may be formed by being directly deposited on one surface of the polarizing plate 100. At this point, in order to improve the adhesion between the transparent conductive layer 200 and the polarizing plate 100, the transparent conductive layer 200 may be formed by performing pre-processing such as a corona processing or a plasma processing on one surface of each polarizing plate 100, and then directly contacting with the surface of each polarizing plate 100 to which the pre-processing is performed. The pre-processing is not limited to the corona processing or the plasma processing, and may be a pre-processing method currently developed or to be developed without harming the purpose of the present disclosure.

According to another embodiment of the present disclosure, in order to improve the adhesion between the transparent conductive layer 200 and the polarizing plate 100, the transparent conductive layer 200 may be formed by directly contacting with each polarizing plate with the highly adhesive layer (not shown) located therebetween, the highly adhesive layer being provided on one surface of each polarizing plate 100.

The transparent conductive layer 200 is preferably have the transmittance with respect to visible light of 50% or more, and for example, may include one or more types selected from a group consisting of transparent conductive oxide, metal, a carbonaceous material, conductive polymer, conductive ink, and nanowires, but the present disclosure is not limited thereto, and a material of a transparent conductive layer currently developed or to be developed later may be used.

According to one or a plurality of embodiments, the transparent conductive oxide may include one or more types selected from a group consisting of indium tin oxide (ITO), indium zinc oxide (IZO), indium zinc tin oxide (IZTO), aluminum zinc oxide (AZO), gallium zinc oxide (GZO), florin tin oxide (FTO), zinc oxide (ZnO), etc. Furthermore, the metal may include one or more types selected from a group consisting of aurum (Au), argentum (Ag), cuprum (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), alloy containing at least one of them, etc., and for example, may include argentum-palladium-cuprum (APC) alloy or cuprum-calcium (CuCa) alloy. The carbonaceous matter may include one or more types selected from a group consisting of carbon nanotube (CNT), graphene, etc., and the conductive polymer may include one or more types selected from a group consisting of polypyrrole, polythiophene, polyacetylene, PEDOT, polyaniline, etc. The conductive ink may be a mixture of metal powder and curable polymer binder, and the nanowires may be for example silver nanowires (AgNW).

Furthermore, the transparent conductive layer 200 may be formed by combining the above-described substances in a structure of two or more layers. For example, in order to reduce the reflectance of incident light and increase the transmittance, the transparent conductive layer may be formed in a structure of two layers including a metal layer and a transparent conductive oxide.

The transparent conductive layer 200 may be formed in a method commonly used in the art and, for example, may be formed using a coating process such as a spin coating method, a roller coating method, a bar coating method, a dip coating method, Gravure coating method, a curtain coating method, a dye coating method, a spray coating method, a doctor coating method, a kneader coating method, etc.; a printing process such as a screen printing method, a spray printing method, an inkjet printing method, a letterpress method, an intaglio printing method, a lithography method, etc.; and a deposition process such as chemical vapor deposition (CVD), physical vapor deposition (PVD), plasma enhanced chemical vapor deposition (PECVD), etc.

The liquid crystal layer 300 may adjust transmittance of light incident in one or a plurality of directions according to electric fields to change a driving mode of the optical stack.

The liquid crystal layer 300 may include liquid crystal compounds and, for example, in an optical control region, may be located in a space provided by a sealant layer (not shown) and a spacer (not shown) that are provided between the first polarizing plate 100-1 and the second polarizing plate 100-2.

The liquid crystal compounds are operated in response to electric fields and is not particularly limited as long as it can control transmittance of light, and liquid crystal compounds developed before and after may be used and, for example, the description of reactive liquid crystal compound of the above-mentioned polarizer may be equally applied thereto.

According to an embodiment, the liquid crystal layer 300 may be driven in a twisted nematic (TN) mode by liquid crystal compound having positive dielectric anisotropy ($\Delta\varepsilon>0$). In this case, optical design with the polarizer 110, the polarizing rotation layer 120-1, and the retardation layer 120-2 described above may improve the light blocking performance of the optical stack in the light blocking mode.

The sealant may contain curable resins as base resins. As the base resins, UV curable resins or heat curable resins that are known to be usable for sealants in the art may be used. The ultraviolet curable resins may be polymers of UV curable monomers. The heat-curable resins may be polymers of heat-curable monomers.

As the base resins of the sealant, for example, acrylate-based resins, epoxy-based resins, urethane-based resins, phenol-based resins, or compounds of these resins may be used. According to an embodiment, the base resins may be acrylate-based resins, and the acrylate-based resins may be polymers of acrylic monomers. For example, the acrylic monomers may be multifunctional acrylate. According to another embodiment, the sealant may contain monomer substances in addition to the base resins. For example, the monomer substances may be monofunctional acrylate. In the specification, the monofunctional acrylate may mean compounds having one acryl group, and the multifunctional acrylate may mean compounds having two or more acryl groups. The curable resins may be cured by UV irradiation and/or heating. The UV irradiation condition or heat condition may be performed appropriately within the scope that does not damage the objective of the present disclosure. In case of need, the sealant may contain an initiator, for example, an optical initiator or a heat initiator.

The sealant may be provided in a method commonly used in the art and, for example, may be formed drawing a sealant at an outer portion of the liquid crystal layer (i.e., inactivate region) with a dispenser having a nozzle.

The spacer may include at least one or more spacers among a ball spacer and a column spacer, and specifically, may preferably be a ball spacer. The ball spacer may include one or more ball spacers and preferably has a diameter ranged from 1 to 10 μm. Furthermore, when viewed in the planar direction, a region where the ball spacer is occupied in the liquid crystal layer 300 is preferably 0.01 to 10% of the area of the liquid crystal layer 300 in an aspect of improvement of user's visibility and transmittance in a light transmissive mode.

Figure 4A:
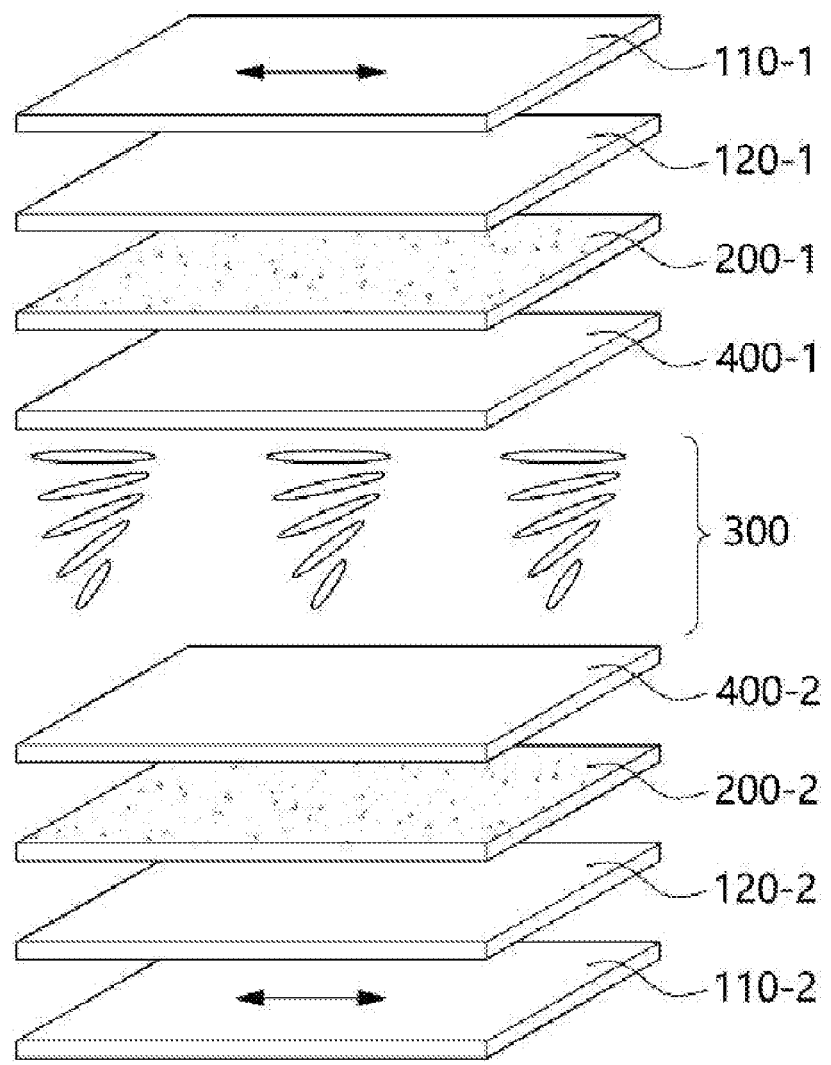
FIGS. 4A and 4B are views each showing a laminate structure of a variable transmittance optical stack according to another embodiment of the present disclosure.
Figure 4B:
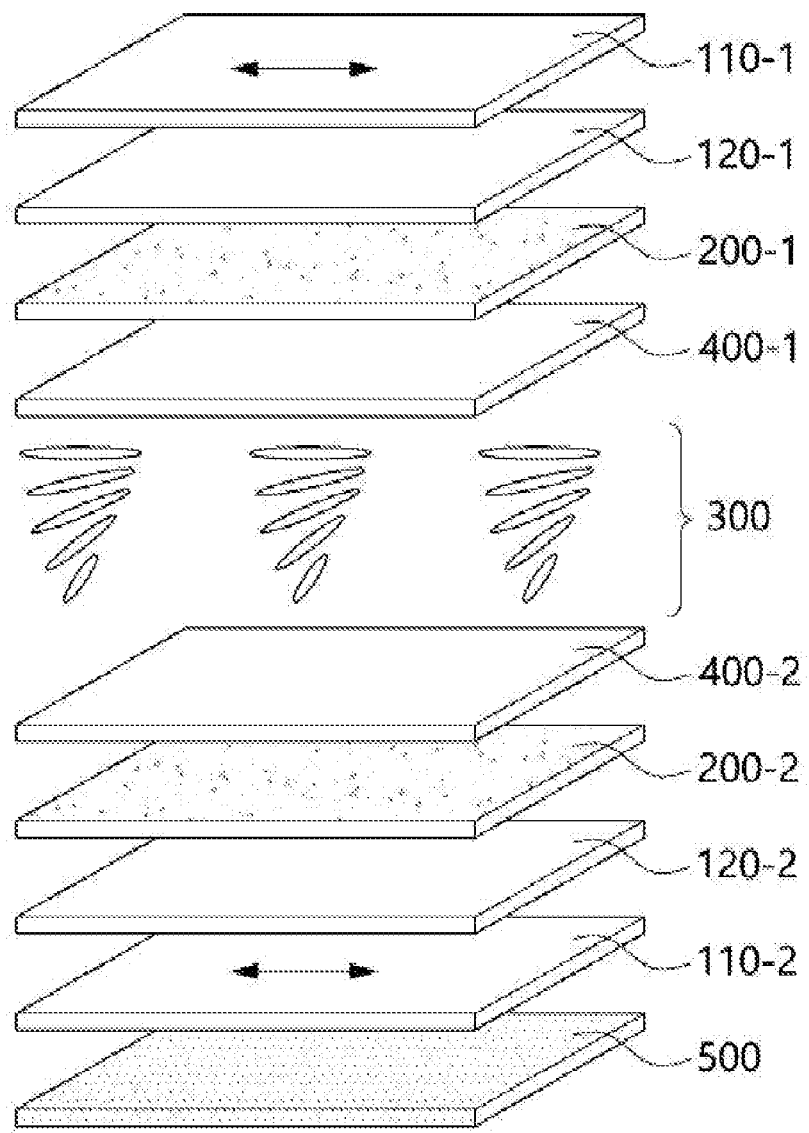

According to the embodiment, the liquid crystal layer 300 may include an alignment film 400 if necessary (referring to FIG. 4A) and, alignment films 400, for example, may be provided as a first alignment film 400-1 and a second alignment film 400-2 formed on opposite surfaces of the liquid crystal layer 300 including liquid crystal compounds.

The alignment film 400 is not particularly limited as long as it adds the orientation to the liquid crystal compounds. For example, the alignment film 400 may be manufactured by coating and curing an alignment film coating composition containing aligned polymers, a photopolymerization initiator, and solvent. Although the aligned polymer is not particularly limited, the aligned polymer may be polyacrylate-based resin, polyamic resin, polyimide-based resin, polymer having cinnamate groups, etc. and may use polymer capable of expressing orientation, the polymer being currently developed or to be developed.

The variable transmittance optical stack of the present disclosure may include other members without affecting the objectives of the present disclosure and, for example, may include the pressure-sensitive adhesive/adhesive layer 500 (referring to 4B) and may include an ultraviolet ray absorption layer, a hard coating layer, etc.

The pressure-sensitive adhesive/adhesive layer 500 may be formed using an adhesive or a pressure-sensitive adhesive, and have appropriate pressure sensitive adhesion/adhesion to prevent peeling, bubbles, etc. from occurring when handling the optical stack, and preferably have transparency and thermal stability.

The adhesive may be an adhesive currently developed or to be developed, for example, may use photocurable adhesive.

The photocurable adhesive provides strong adhesion by being crosslinked and cured by receiving active energy rays such as ultraviolet (UV), electron beam (EB), etc., and may be composed of reactive oligomers, reactive monomers, a photopolymerization initiator, and the like.

The reactive oligomers are important components that determine the characteristics of adhesive, and form polymer binding by photopolymerization to form a cured film. For example, the available oligomers may be polyester-based resin, polyether-based resin, polyurethane-based resin, epoxy-based resin, polyacryl-based resin, silicon-based resin, and the like.

The reactive monomers may serve as crosslinker, diluent of the reactive oligomers described above, and affect adhesion characteristics. For example, the available reactive monomers may be monofunctional monomers, multifunctional monomers, epoxy-based monomers, vinyl ethers, cyclic ethers, and the like.

The photopolymerization initiator may absorb light energy to generate radicals or cations to initiate photopolymerization, and a proper type may be selected and used depending on photopolymerization resin.

The pressure-sensitive adhesive may use a pressure-sensitive adhesive currently developed or to be developed. According to one or a plurality of embodiments, as the pressure-sensitive adhesive, acryl-based pressure-sensitive adhesive, rubber-based pressure-sensitive adhesive, silicon-based pressure-sensitive adhesive, urethane-based pressure-sensitive adhesive, polyvinyl alcohol-based pressure-sensitive adhesive, polyvinyl pyrrolidone-based pressure sensitive adhesive, polyacrylamide-based pressure sensitive adhesive, cellulose-based pressure sensitive adhesive, vinylalky ether-based pressure sensitive adhesive and the like. The pressure-sensitive adhesive is not particularly limited as long as it has pressure-sensitive adhesion and viscoelasticity. For ease of acquisition, preferably, the pressure-sensitive adhesive may include acryl-based pressure-sensitive adhesive, for example, may be (meth) acrylate copolymers, crosslinkers, solvents, and the like.

The crosslinkers may be crosslinkers currently developed or to be developed and, for example, polyisocyanate compounds, epoxy resins, melamine resins, urea resins, dialdehydes, methylol polymers, etc., and may preferably contain polyisocyanate compounds.

The solvents may include common solvents used in the field of resin compositions. For example, the solvents may use solvents such as: alcohol-based compounds such as methanol, ethanol, isopropanol, butanol, propylene glycol methoxy alcohol, and the like; ketone-based compounds such as methyl ethyl ketone, methyl butyl ketone, methyl isobutyl ketone, diethyl ketone, dipropyl ketone, and the like; acetate-based compounds such as methyl acetate, ethyl acetate, butyl acetate, propylene glycol methoxy acetate, and the like; cellosolve-based compounds such as methyl cellosolve, ethyl cellosolve, propyl cellosolve, etc.; hydrocarbon-based compounds such as hexane, heptane, benzene, toluene, xylene, and the like. The solvents may be used alone or combination of two or more types.

The thickness of the pressure sensitive adhesive/adhesive layer 500 may be appropriately determined depending on a type of resins serving as the pressure sensitive adhesive/adhesive, the strength of the pressure sensitive adhesive/adhesive, the environment where the pressure sensitive adhesive/adhesive is used, and the like. According to an embodiment, the pressure sensitive adhesive/adhesive layer may have a thickness ranging from 0.01 to 50 μm in order to ensure sufficient adhesion and minimize the thickness of the optical stack and, preferably, may have a thickness ranging from 0.05 to 20 μm and, more preferably, may have a thickness ranging from 0.1 to 10 μm.

The ultraviolet ray absorption layer is not particularly limited as long as it is to prevent deterioration of the optical stack due to UV rays. For example, the ultraviolet ray absorption layer may use salicylic acid-based ultraviolet absorber (phenyl salicylate, p-tert-butyl salicylate, etc.), benzophenone-based ultraviolet absorber (2,4-dihydroxybenzophenone, 2,2'-dihydroxy-4,4'-dimethoxybenzophenone, etc.), benzotriazole-based ultraviolet absorber (2-(2'-hydroxy-5'-methylphenyl)benzotriazole, 2-(2'-hydroxy-3', 5'-di-tert-butylphenyl)benzotriazole, 2-(2'-hydroxy-3'-tert-butyl-5'-methylphenyl)benzotriazole, 2-(2'-hydroxy-3',5'-di-tert-butylphenyl)-5-chlorobenzotriazole, 2-(2'-hydroxy-3'-

(3",4",5",6"-tetrahydrophthalimide methyl)-5'-methylphenyl)benzotriazole, 2,2-methylenebis (4-(1,1,3,3-tetramethylbutyl)-6-(2H-benzotriazole-2-yl)phenol), 2-(2'-hydroxy-3'-tert-butyl-5'-methylphenyl)-5-chlorobenzotriazole, 2-(2'-hydroxy-3'-tert-butyl-5'-(2-octyloxicarbonylethyl)-phenyl)-5-chlorobenzotriazole, 2-(2'-hydroxy-3'-(1-methyl-1-phenylethyl)-5'-(1,1,3,3-tetramethylbutyl)-phenyl)benzotriazole, 2-(2H-benzotriazole-2-yl)-6-(linear and side chain dodecyl)-4-methylphenol, octyl-3-[3-tert-butyl-4-hydroxy-5-(chloro-2H-benzotriazole-2-yl)phenyl]propionate and 2-ethylhexyl-3-[3-tert-butyl-4-hydroxy-5-(5-chloro-2H-benzotriazole-2-yl)phenyl]propionate compounds, etc.), cyanoacrylate-based ultraviolet absorber (2'-ethylhexyl-2-cyano-3,3-diphenylacrylate, ethyl-2-cyano-3-(3',4'-methylene dioxyphenyl)-acrylate, etc.), triazine-based ultraviolet absorber, etc. The benzotriazole-based ultraviolet absorber or the triazine-based ultraviolet absorber that have high transparency and the excellent effect of preventing deterioration of the polarizing plate or the variable transmittance layer may be preferably used as the ultraviolet ray absorption layer, and the benzotriazole-based ultraviolet absorber having more appropriate spectral absorption spectroscopy absorption spectrum may be preferable. The benzotriazole-based ultraviolet absorber may be changed into "-Bis" and, for example, may be 6,6'-methylene bis (2-(2H-benzo[d][1,2,3]triazole-2-yl)-4-(2,4,4-trimethylpentane-2-yl)phenol), 6,6'-methylene bis (2-(2H-benzo[d][1,2,3]triazole-2-yl)-4-(2-hydroxyethyl)phenol), etc.

The hard coating layer is not particularly limited as long as it is able to protect members such as the polarizing plate, the variable transmittance layer, etc. from external physical and chemical shocks, and hard coating layers currently developed or to be developed may be used thereto.

According to the embodiment, the hard coating layer may be formed by applying compositions for forming a hard coating layer on another member and then curing the layer with light or heat. The compositions for forming a hard coating layer are not particularly limited and, for example, may include photocurable compounds and a photoinitiator.

As the photocurable compounds and the photoinitiator, those commonly used in the art can be used without limitation, for example, the photocurable compounds may be photopolymerizable monomers, photopolymerizable oligomers, etc., for example, may be monofunctional and/or multifunctional (meth) acrylate, and the photoinitiator may be an oxime ester-based photoinitiator, etc.

In addition to the variable transmittance optical stack, the present disclosure includes a smart window including the same. Furthermore, the present disclosure includes a vehicle in which the smart window is applied to at least one of front windows, rear windows, side windows, sunroof windows, and inner partitions, and a building window including the smart window.

Mode for Invention

Hereinbelow, an embodiment of the present disclosure will be described in detail. However, the present disclosure may not be limited to embodiments disclosed below and may be implemented in various shapes, and the embodiments merely ensure that the present disclosure of the present disclosure is complete and is provided to fully inform those skilled in the art of the scope of the invention, and may be defined by the scope of the claims.

Examples and Comparative Examples:
Manufacturing of the Optical Stack

According to Table 1 and FIG. 1 below, the optical stacks are manufactured according to the examples and the comparative examples in which the liquid crystal layer is provided between two different polarizing plates with absorbing axes parallel to each other.

At this point, each absorbing axis is practically parallel to the MD of the polarizer, and an alignment axis of a liquid crystal composition contained in the liquid crystal layer and an optical axis of the half-wavelength plate are values obtained when the absorbing axis of the polarizer is to 0°, in the planar direction.

TABLE 1

| | | Liquid crystal layer | | Half-wavelength plate (polarizing rotation layer) | | | Negative C plate |
| | | lower liquid crystal | upper liquid crystal | | | | |
| Classification | Mode | alignment axis | alignment axis | $R_{in}(450)/R_{in}(550)$ | $R_{in}$ | optical axis | (retardation layer) $R_{th}$ |
| --- | --- | --- | --- | --- | --- | --- | --- |
| Comparative example 1 | TN | 0° | 90° | 1 | 275 nm | 45° | not including |
| Example 1 | TN | 0° | 90° | 1 | 275 nm | 45° | 50 nm |
| Example 2 | TN | 0° | 90° | 1 | 275 nm | 45° | 100 nm |
| Example 3 | TN | 0° | 90° | 1 | 275 nm | 45° | 200 nm |
| Example 4 | TN | 0° | 90° | 1 | 275 nm | 45° | 300 nm |
| Comparative example 2 | TN | 0° | 90° | 0.88 | 280 nm | 45° | not including |
| Example 5 | TN | 0° | 90° | 0.88 | 280 nm | 45° | 50 nm |
| Example 6 | TN | 0° | 90° | 0.88 | 280 nm | 45° | 100 nm |
| Example 7 | TN | 0° | 90° | 0.88 | 280 nm | 45° | 200 nm |
| Example 8 | TN | 0° | 90° | 0.88 | 280 nm | 45° | 300 nm |

Experimental Example: Evaluation of Transmittance

With respect to the optical stacks of the examples 1 to 8 and the comparative examples 1 and 2, the minimum transmittance with voltage applied and transmittance without voltage applied, that are measured in the front direction and the side direction (diagonal direction; φ=45°, θ=60°), are evaluated and represented in Table 2 below.

TABLE 2

| Classification | Front direction | | Side direction (diagonal direction; φ = 45°, θ = 60°) | |
|---|---|---|---|---|
| | Without voltage applied | With voltage applied | Without voltage applied | With voltage applied |
| Comparative example 1 | 36.3% | 0.48% | 16.3% | 7.6% |
| Example 1 | 36.3% | 0.48% | 18.5% | 4.9% |
| Example 2 | 36.4% | 0.48% | 20.4% | 2.8% |
| Example 3 | 36.4% | 0.48% | 23.0% | 1.9% |
| Example 4 | 36.5% | 0.48% | 22.1% | 7.4% |
| Comparative example 2 | 36.6% | 0.18% | 17.6% | 10.9% |
| Example 5 | 36.6% | 0.18% | 18.9% | 7.6% |
| Example 6 | 36.7% | 0.18% | 19.9% | 4.6% |
| Example 7 | 36.8% | 0.18% | 20.4% | 1.4% |
| Example 8 | 36.8% | 0.18% | 18.1% | 4.5% |

Referring to Table 2, it may be shown that the optical stacks of the examples 1 to 4 including the polarizing rotation layer ($R_{in}(450)/R_{in}(550)=1$, $R_{in}=275$ nm) and the negative C plate has the effect in which side (diagonal) light leakage is further reduced in comparison to the optical stack of the comparative example 1 having the laminate structure equal to the optical stack of the examples 1 to 4, except for excluding the negative C plate. Specifically, side (diagonal) transmittance without voltage applied of the optical stack of each of the examples 1 to 4 is equal to or higher than 18%, more specifically from 18.5% to 23.0%, and side (diagonal) transmittance with voltage applied is less than 7.5%, more specifically from 1.9% to 7.4%. Therefore, the optical stack of each of the examples 1 to 4 may be evaluated as side (diagonal) light leakage is further reduced in comparison to the optical stack of the comparative example 1 in which transmittance without voltage applied and transmittance with voltage applied are less than 18% (16.3%) and higher than 7.5% (7.6%).

Furthermore, it may be shown that the optical stacks of the examples 5 to 8 including the polarizing rotation layer ($R_{in}(450)/R_{in}(550)=0.88$, $R_{in}=280$ nm) and the negative C plate has the effect in which side (diagonal) light leakage is further reduced in comparison to the optical stack of the comparative example 2 having the laminate structure equal to the optical stack of the examples 5 to 8, except for excluding the negative C plate. Specifically, side (diagonal) transmittance without voltage applied of the optical stack of each of the examples 5 to 8 is equal to or higher than 18%, more specifically from 18.1% to 20.4%, and side (diagonal) transmittance with voltage applied is less than 8%, more specifically from 1.4% to 7.6%. Therefore, the optical stack of each of the examples 5 to 8 may be evaluated as side (diagonal) light leakage is further reduced in comparison to the optical stack of the comparative example 2 in which transmittance without voltage applied and transmittance with voltage applied are less than 18% (17.6%) and higher than 8% (10.9%).

Therefore, the above results show that the variable transmittance optical stack of the present disclosure, which includes the polarizing rotation layer having the reverse wavelength or flat wavelength dispersion characteristic and including the negative C plate, has excellent light blocking performance in the light blocking mode, and specifically, side (diagonal) light leakage thereof is further reduced.

INDUSTRIAL APPLICABILITY

According to the present disclosure, the variable transmittance optical stack is formed without the process of forming a conductive layer on a substrate for forming the conventional optical stack and bonding it to other members, etc., so that the manufacturing process of the variable transmittance optical stack of the present disclosure can be simplified in comparison to the conventional optical stack.

The invention claimed is:
1. A variable transmittance optical stack comprising:
   a first polarizing plate comprising a first polarizer and a polarizing rotation layer;
   a first transparent conductive layer formed on one surface of the first polarizing plate;
   a second polarizing plate comprising a second polarizer and a retardation layer, and opposing the first polarizing plate;
   a second transparent conductive layer formed on one surface of the second polarizing plate, and opposing the first transparent conductive layer; and
   a liquid crystal layer provided between the first transparent conductive layer and the second transparent conductive layer,
   wherein at least one transparent conductive layer of the first transparent conductive layer and the second transparent conductive layer is formed by directly contacting with any one polarizing plate of the first polarizing plate and the second polarizing plate,
   wherein the polarizing rotation layer has a reverse wavelength or flat wavelength dispersion characteristic,
   wherein the retardation layer comprises a negative C plate,
   wherein an absorbing axis of the first polarizer and an absorbing axis of the second polarizer are parallel to each other, and
   wherein the liquid crystal layer is driven in a twisted nematic mode.
2. The variable transmittance optical stack of claim 1, wherein the polarizing rotation layer is provided at an inside position based on the first polarizer.
3. The variable transmittance optical stack of claim 1, wherein the polarizing rotation layer has a ratio of 0.75 to 1.0 of an in-plane retardation value at 450 nm wavelength to an in-plane retardation value at 550 nm wavelength.
4. The variable transmittance optical stack of claim 1, wherein the polarizing rotation layer comprises a single-layered or multi-layered half-wavelength plate.
5. The variable transmittance optical stack of claim 4, wherein an in-plane retardation value of the half-wavelength plate ranges from 250 to 300 nm.
6. The variable transmittance optical stack of claim 1, wherein the retardation layer is provided at an inside position based on the second polarizer.
7. The variable transmittance optical stack of claim 1, wherein a thickness-directional retardation value of the retardation layer ranges from 10 to 500 nm.
8. The variable transmittance optical stack of claim 1, wherein at least one transparent conductive layer of the first transparent conductive layer and the second transparent conductive layer is formed by directly contacting with any one polarizing plate of the first polarizing plate and the second polarizing plate without an additional substrate between the polarizing plate and the transparent conductive layer.
9. The variable transmittance optical stack of claim 1, wherein at least one transparent conductive layer of the first transparent conductive layer and the second transparent conductive layer is formed by directly contacting with any one polarizing plate of the first polarizing plate and the second polarizing plate with a highly adhesive layer between the polarizing plate and the transparent conductive layer.

10. The variable transmittance optical stack of claim 1, wherein at least one transparent conductive layer of the first transparent conductive layer and the second transparent conductive layer comprises one or more types selected from a group consisting of transparent conductive oxide, metal, carbonaceous material, conductive polymers, conductive ink, and nanowires.

11. The variable transmittance optical stack of claim 1, wherein at least one polarizing plate of the first polarizing plate and the second polarizing plate comprises one or more types of functional layers selected from a group consisting of a protective layer and a refractive index-matching layer.

12. The variable transmittance optical stack of claim 1, wherein at least one polarizing plate of the first polarizing plate and the second polarizing plate has a thickness ranging from 30 to 200 μm.

13. The variable transmittance optical stack of claim 1, wherein the liquid crystal layer comprises one or more types selected from a group consisting of a ball spacer and a column spacer.

14. The variable transmittance optical stack of claim 13, wherein the ball spacer has a diameter ranging from 1 to 10 μm.

15. The variable transmittance optical stack of claim 13, wherein an occupancy area of the ball spacer in the liquid crystal layer ranges from 0.01 to 10% of an area of the liquid crystal layer.

16. The variable transmittance optical stack of claim 1, further comprising:
   one or more types selected from a group consisting of an alignment film, a pressure sensitive adhesive/adhesive layer, an ultraviolet ray absorption layer, and a hard coating layer.

17. A method for manufacturing the variable transmittance optical stack of claim 1.

18. A smart window comprising the transmittance variable optical stack of claim 1.

* * * * *